United States Patent
Tare et al.

(10) Patent No.: US 7,383,279 B2
(45) Date of Patent: Jun. 3, 2008

(54) UNIFIED REPORTING

(75) Inventors: Kailas Gangadhar Tare, Redmond, WA (US); Rajesh M Munshi, Redmond, WA (US); Sivaprasad V Padisetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/074,463

(22) Filed: Mar. 7, 2005

(65) Prior Publication Data
US 2006/0200484 A1    Sep. 7, 2006

(51) Int. Cl.
*G06F 7/00* (2006.01)
*G06F 17/00* (2006.01)
(52) U.S. Cl. ...................................... 707/102; 707/100
(58) Field of Classification Search .................. 707/1, 707/100, 101, 102
See application file for complete search history.

(56) References Cited

U.S. PATENT DOCUMENTS

| | | | |
|---|---|---|---|
| 6,691,140 B1 * | 2/2004 | Bogrett | 707/205 |
| 2003/0084053 A1 * | 5/2003 | Govrin et al. | 707/100 |
| 2003/0229652 A1 * | 12/2003 | Bakalash et al. | 707/200 |
| 2004/0215626 A1 * | 10/2004 | Colossi et al. | 707/100 |

* cited by examiner

*Primary Examiner*—Sam Rimell
*Assistant Examiner*—Sheikh M Kabir
(74) *Attorney, Agent, or Firm*—Christensen O'Connor Johnson Kindness PLLC (57) ABSTRACT

A framework is provided that uniformly stores in a central repository data collected from various locations in an enterprise computing network. One or more measurements for data of interest in the central repository are pre-calculated. The pre-calculated measurement(s) are normalized to reflect the relative importance of the data of interest in comparison to other data in the central repository. Reports may be generated based on the pre-calculated measurements for the data of interest.

12 Claims, 5 Drawing Sheets

| | |
|---|---|
| | WEIGHT — 402 |
| | PASSED — 404 |
| | FAILED — 406 |
| | NOT RUN — 408 |
| | NOT APPLICABLE — 410 |
| | % ATTEMPTED — 412 |
| | % PASSED — 414 |
| | STATUS — 416 |
| | OVERRIDDEN STATUS — 418 |
| | ... |

| SAMPLE UNIFIED REPORT | | | | | | |
|---|---|---|---|---|---|---|
| FEATURE HIERARCHY | TOTAL | (MEASUREMENTS) PASSED | FAILED | NOT RUN | PERCENT ATTEMPT | PERCENT PASS | STATUS |
| ☐ ALL ▶ | 365229 | 31398 | 25139 | 911 | 15% | 56% | |

UNIFIED REPORTING

FIELD OF THE INVENTION

The present invention relates generally to computer software and, more particularly, to electronic data management.

BACKGROUND OF THE INVENTION

The development of information technologies has enabled an enterprise, such as a business corporation, to capture data produced during daily operation of the enterprise. For example, a software company may capture and store data accumulated during the design, coding, and testing of a software product in various computing systems. Such data may include test cases that are used to verify whether the software product functions as expected. Such data may also include one or more dimensions that specify context(s) that a test case may execute in. A dimension may specify, for example, one or more product features that the text case focuses on. A dimension may also specify which build version of the product that the test case executes on. If the software product supports multiple user interface (hereinafter "UI") languages, a dimension may indicate a particular UI language that the test case executes in. Data gathered during the development of a software product may also include execution results of each test case (hereinafter "test results"). For example, test results may indicate the success or failure rate of a test case that has been executed multiple times in a specific context.

Data accumulated by an enterprise may lack uniformity because data can be generated with different tools and/or criteria. For example, a software company may assign multiple teams to execute different aspects of a software development process, e.g., multiple coding teams to code different components of the software product and multiple testing teams to test different components of the software product. Each of these teams may develop its own system for tracking the progress of its work. As a result, different teams may use different means and criteria to collect data. Thus, data aggregated from the different teams in general lack uniformity and cannot accurately reflect the status of the whole product. For example, each testing team has its own database and each testing team creates separate reports based on the team's database. Because the databases generally are not connected and do not follow a common database schema, it is difficult to get consolidated reports for the software product as a whole.

Therefore, there exists a need to provide reliable and comprehensive data for a product while allowing different teams of the product to use their own systems to collect data resulting from their work. Ideally, data produced by different teams are gathered and uniformly stored in a central repository. The data in the central repository can thus accurately reflect the status of the product.

In addition, people with different responsibilities in an enterprise may want to review different reports concerning a product or service of the enterprise. For example, reports requested by a company executive and by a software engineer may be drastically different. The company executive may only be interested in whether a software product is ready for distribution. The software engineer may want to know how a test case for the software product performs in a particular context. Hence, it is desirable to provide different reports based on various abstractions of data available for a product or service of an enterprise, so people with different responsibilities in the enterprise may review reports according to specific needs.

Meanwhile, because a central repository may contain hundreds and thousands of data dimensions and their corresponding values, a query on the central repository can be time-consuming. Therefore, it is desirable to pre-calculate measurements of data of interest in the central repository so that a query will only need to retrieve the pre-calculated measurements of data of interest.

Therefore, there exists a need to gather data in an enterprise and uniformly store them in a central repository so that the data can accurately reflect the overall status of a product or service of the enterprise. There also exists a need to pre-calculate measurements of data of interest stored in the central repository so that any query on the data of interest can be responded quickly.

SUMMARY OF THE INVENTION

The invention addresses the above-identified needs by providing a framework that stores, in a central repository, data collected from various data stores in an enterprise computing network. The invention also enables a user to create one or more unified reporting cubes, each of which pre-calculates measurements for data of interest in the central repository. Preferably, the invention provides a unified reporting cube administration UI, through which a user can define and create one or more unified reporting cubes based on data dimensions in the central repository. The invention also provides a unified reporting UI, through which a user can create one or more reports, using the pre-calculated measurements in a unified reporting cube. As a result, the process of querying the central repository and creating a report is much faster because of the pre-calculation of measurements for data of interest in the central repository.

According to one aspect of the invention, one or more central repositories are provided to aggregate data existing in various data stores in an enterprise computing network. Preferably, a central repository identifies one or more data stores that supply data for the central repository. Preferably, a unified reporting crawler service continuously collects data from the one or more data stores and stores the data in the central repository. A central repository contains a single database schema; thus, data gathered from different data stores are stored in the central repository in a uniform format.

Another aspect of the invention generates one or more unified reporting cubes, each of which pre-calculates one or more measurements for data of interest in a central repository. Preferably, a pre-calculated measurement for the data of interest is normalized to reflect the importance of the data of interest relative to other data in the central repository. Preferably, a unified reporting cube administration UI is provided, through which a user can define a unified reporting cube. For example, the unified reporting cube administration UI will enable a user to identify data of interest in a central repository.

In accordance with a further aspect of the invention, a unified reporting UI is provided to create one or more reports based on information contained in a unified reporting cube. For example, the unified reporting provided by a unified reporting cube UI allows a user to select one or more pre-calculated measurements for the selected data of interest.

In addition, if a data gathered from one or more data stores include one or more computing jobs (hereinafter "job") and one or more results of executing a job, the pre-calculated measurements for such data include a Weight measurement, which indicates the normalized number of attempted executions of a job. The pre-calculated measurements for such data may also include a Passed measurement, which indicates the normalized number of successful executions of a job. The pre-calculated measurements for such data may further include a Failed measurement, which indicates the normalized number of failed executions of a job. Preferably, the pre-calculated measurements for such data further include an attempt rate that is calculated with the formula ((Passed+Failed)/Weight), a pass rate that is calculated with the formula (Passed/(Passed+Failed)), and a status code that indicates the overall performance of a job.

In summary, the invention provides a framework that allows a user to quickly create multi-dimensional reports based on pre-calculated measurements of data of interest in a central repository, which uniformly stores data gathered from different data stores in an enterprise. By providing a centralized reporting tool for data existing in various formats and/or locations in an enterprise computing network, the invention relieves different teams in the enterprise from the need to write individual reporting tools. By centralizing data at the central repository and providing uniform data, the invention avoids confusion caused by inconsistency in data because all reports will come from the central repository. By pre-calculating measurements for data in the central repository, the invention speeds up the performance of generating reports concerning data in the central repository.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The invention provides a framework for analyzing and reporting on data stored in various data stores of an enterprise computing network. More specifically, the invention gathers data from the various data stores, for example, by using a unified reporting crawler. The invention stores the gathered data uniformly in a central repository. The invention allows a user to define and create one or more unified reporting cubes, each of which pre-calculates measurements of data of interest in the central repository. A report concerning data of interest in the central repository can thus be executed quickly by using the pre-calculated measurements of the data of interest.

The invention will primarily be described in the context of gathering, analyzing, and reporting data, such as test cases and test results, stored in various data stores in an enterprise computing network. However, those skilled in the relevant art and others will appreciate that the invention is also applicable to any data in an enterprise that can be stored uniformly in a central repository and be pre-calculated for generating reports.

Figure 1:
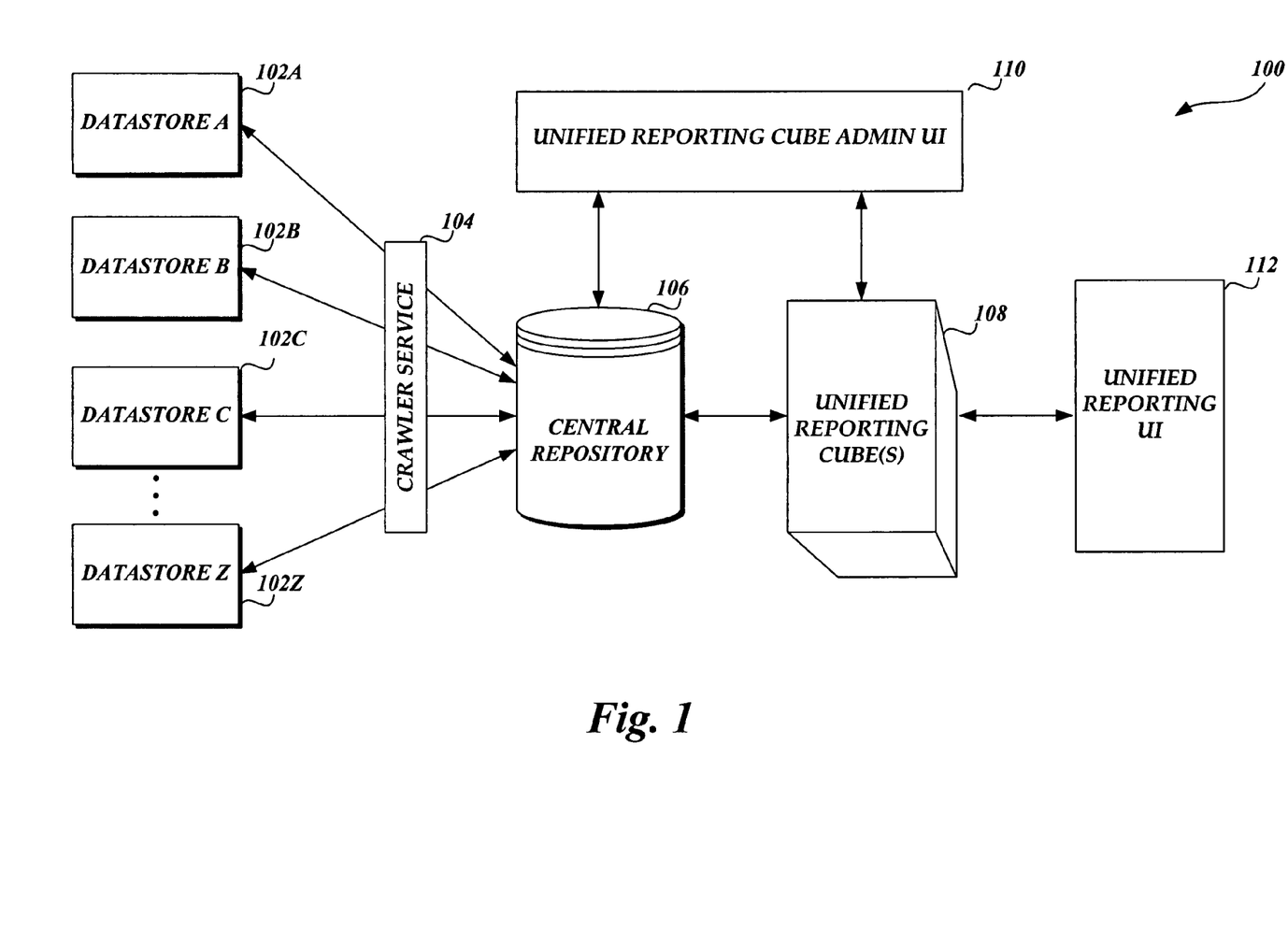
FIG. 1 is a block diagram illustrating an exemplary computing architecture that implements aspects of the invention.

FIG. 1 is a block diagram illustrating an exemplary computing architecture 100 of the invention. As shown in FIG. 1, the computing architecture 100 includes a plurality of data stores such as representative data stores A (102A), B (102B), C (102C) and Z (102Z). Preferably, the computing architecture 100 includes a crawler service 104 that queries the plurality of data stores to collect data such as test cases and test results and deposit the data in a central repository 106. The central repository 106 includes a single database schema that enables data to be stored uniformly. The computing architecture 100 also includes one or more unified reporting cubes 108, each of which pre-calculates measurements for data of interest in the central repository 106. Preferably, the computing architecture 100 also includes a unified reporting cube administration UI 110, through which a user may create one or more unified reporting cubes 108. The computing architecture 100 further includes a unified reporting UI 112, which allows a user to create one or more reports based on a unified reporting cube 108 that contains pre-calculated measurements for data of interest in the central repository 106. The following text describes in detail these exemplary components in the computing architecture 100.

A central repository 106 holds collections of data in one or more data stores A-Z (102A-102Z). The plurality of data stores A-Z may be a subset of or all available data stores in an enterprise computing network. In an enterprise such as a business corporation, computers with different platforms, operating systems, protocols, and network architectures can be interconnected to fulfill the enterprise's various computing needs. As a result, these computers may contain a variety of data stores, such as data stores A-Z (102A-102Z), that hold data concerning products and/or services of the enterprise. Such data, for example, can be test cases and test results.

In an exemplary embodiment of the invention, a test case includes one or more tasks that verify expected functionality of a software product. A test case is associated with one or more constraints that restrict the test case to run on a machine with specific configuration dimensions. A machine configuration dimension (hereinafter "dimension") may describe an attribute and any necessary hardware or software peripherals associated with the machine. For example, a dimension may specify the data processor, the operating system, or the UI language attribute of a machine. When a test case executes on a machine that meets the constraints associated with the test case, a test result is produced. A test case may be executed in different machine configurations. This means that a test case may be associated with different sets of constraints, each set of constraints specifying one specific machine configuration for executing the test case.

On the other hand, a test result is only associated with one specific machine configuration. In an exemplary embodiment of the invention, a test result is associated with a set of metadata. The metadata discloses the outcome of executing a test case. The outcome of executing a test case can be, for example, that the test case has passed, i.e., successfully run; has failed; not executed at all; or not applicable, i.e., cannot run on a machine with a specific machine configuration. The metadata also discloses information on the configuration of the machine on which the test case has been run.

For example, assume a test case is defined to test the Notepad software. The test case may have a Constraint 1 "OS=Windows® XP," a Constraint 2 "processor=Intel® X86 or AMD 64," and a Constraint 3 "OS BuildNumber=1045." Once the test case has been successfully executed, the metadata associated with the test result may include a "Passed" parameter whose value is set to TRUE. The metadata associated with the test result may have configuration information such as "OS=Windows® XP," "Processor=Intel® X86," "OS BuildNumber=1045," "MachineName=MyDevBox," and "UI language=English."

A central repository thus stores test cases, test results, dimensions and dimension values that indicate constraints of test cases and metadata for test results. A central repository is extensible with any number of dimensions. The invention enables a user to generate reports on test cases based on different dimension values, and test results based on interaction of the dimension values.

In embodiments of the invention, the central repository 106 collects data from the plurality of data stores A-Z (102A-102Z). For example, exemplary embodiments of the invention provide a unified reporting crawler service such as the crawler service 104. The crawler service 104 scans the data stores A-Z (102A-102Z). From each data store, the crawler service 104 collects data such as test cases, test results, and dimensions. For a software product, the dimensions can include software features, software build numbers, UI languages. Preferably, the crawler service 104 continuously collects data from the data stores until it is paused or stopped. Preferably, each time the crawler service 104 crawls a data store, the crawler service 104 only queries data in the data store that have been changed since the previous crawl.

In embodiments of the invention, an enterprise may include one or more central repositories 106. A central repository 106 stores data crawled from one or more data stores A-Z (102A-102Z). A central repository 106 may also contain a list identifying the data stores that will supply data to the central repository 106.

In embodiments of the invention, the central repository 106 provides a single database schema for storing data collected from the plurality of data stores A-Z (102A-102Z) in a uniform way. In an exemplary embodiment of the invention, the schema stores data such as test cases, test case contexts, feature hierarchies, and test results. The schema also stores constraints associated with each test case, test case context, and test result. The central repository 106 also stores dimensions, which can be added or removed by a user through the unified reporting cube administration UI 110. The schema thus enables the central repository 106 to store data collected from different data stores A-Z (102A-102Z) in a uniform format. The central repository 106 thus supports business decision-making by collecting, consolidating, and organizing data existing in different data stores A-Z (102A-102Z) in an enterprise.

Embodiments of the invention pre-calculate data in a central repository 106 to improve the performance of subsequent queries and reports concerning the data. Exemplary embodiments of the invention organize data in a central repository 106 into a plurality of multi-dimensional unified reporting cubes 108. Each unified reporting cube 108 (hereinafter "cube") is a multi-dimensional matrix encompassing pre-calculated measurements of data of interest in the central repository 106. In exemplary embodiments of the invention, data of interest may comprise one or more data dimensions in the central repository 106.

A cube 108 represents one or more data dimensions in a central repository 106. For example, in an exemplary embodiment of the invention, a cube 108 includes the following default data dimensions: OS, OS build number, processor, UI language, and original client machine. An intersection point on a cube 108 is the point where one or more data dimensions meet.

Figure 2:
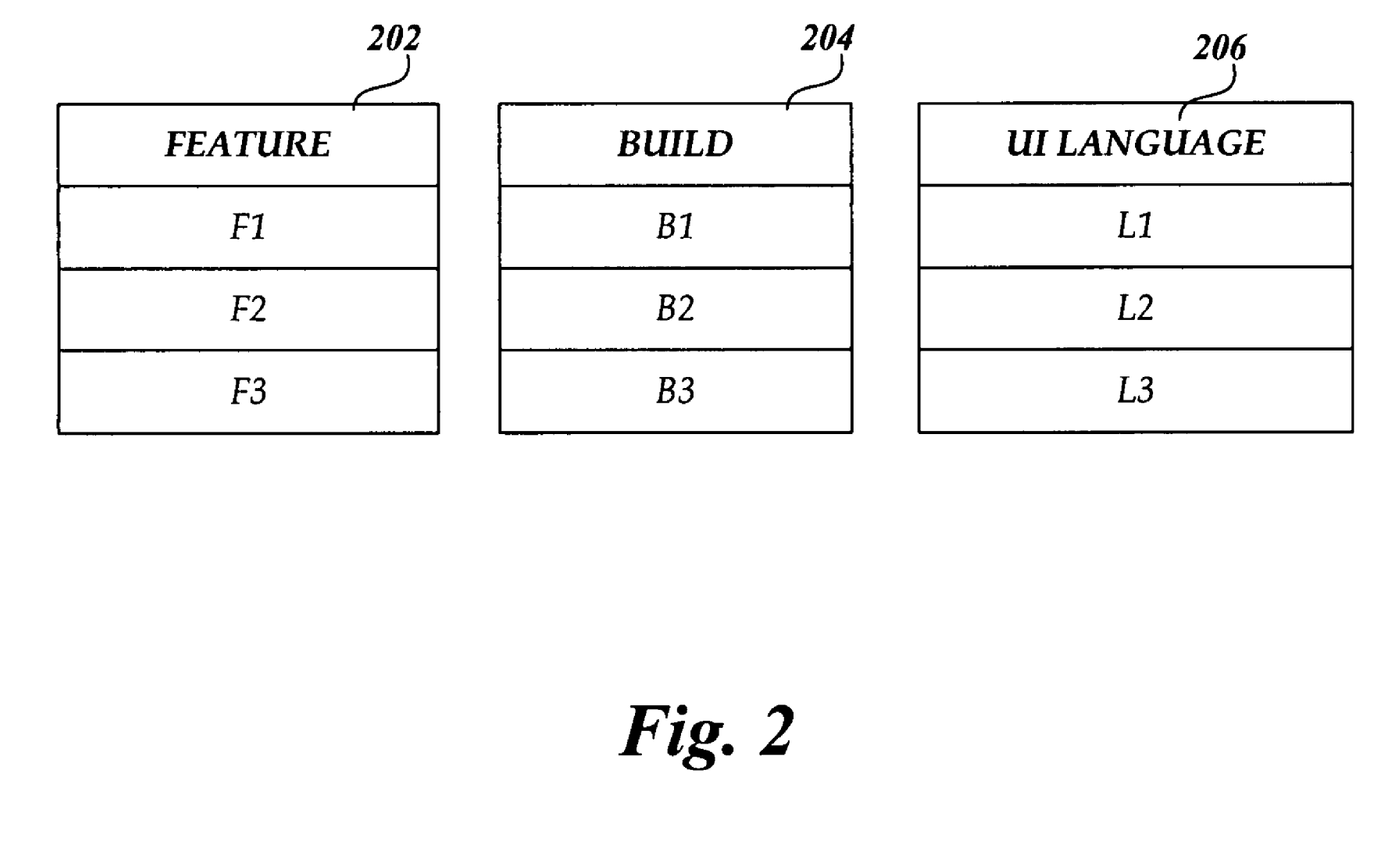
FIG. 2 is a block diagram illustrating three exemplary data dimensions contained by a central repository.

FIG. 2 illustrates three exemplary data dimensions in a central repository 106: Feature dimension 202, Build dimension 204, and UI Language dimension 206. Each exemplary data dimension is represented as a table, which contains dimension values collected from one or more data stores A-Z (102A-102Z). For example, as shown in FIG. 2, the Feature dimension 202 contains three values: F1, F2, and F3. The Build dimension 204 contains three build numbers: B1, B2, and B3. The UI Language dimension 206 contains three UI languages: L1, L2, and L3.

Figure 3:
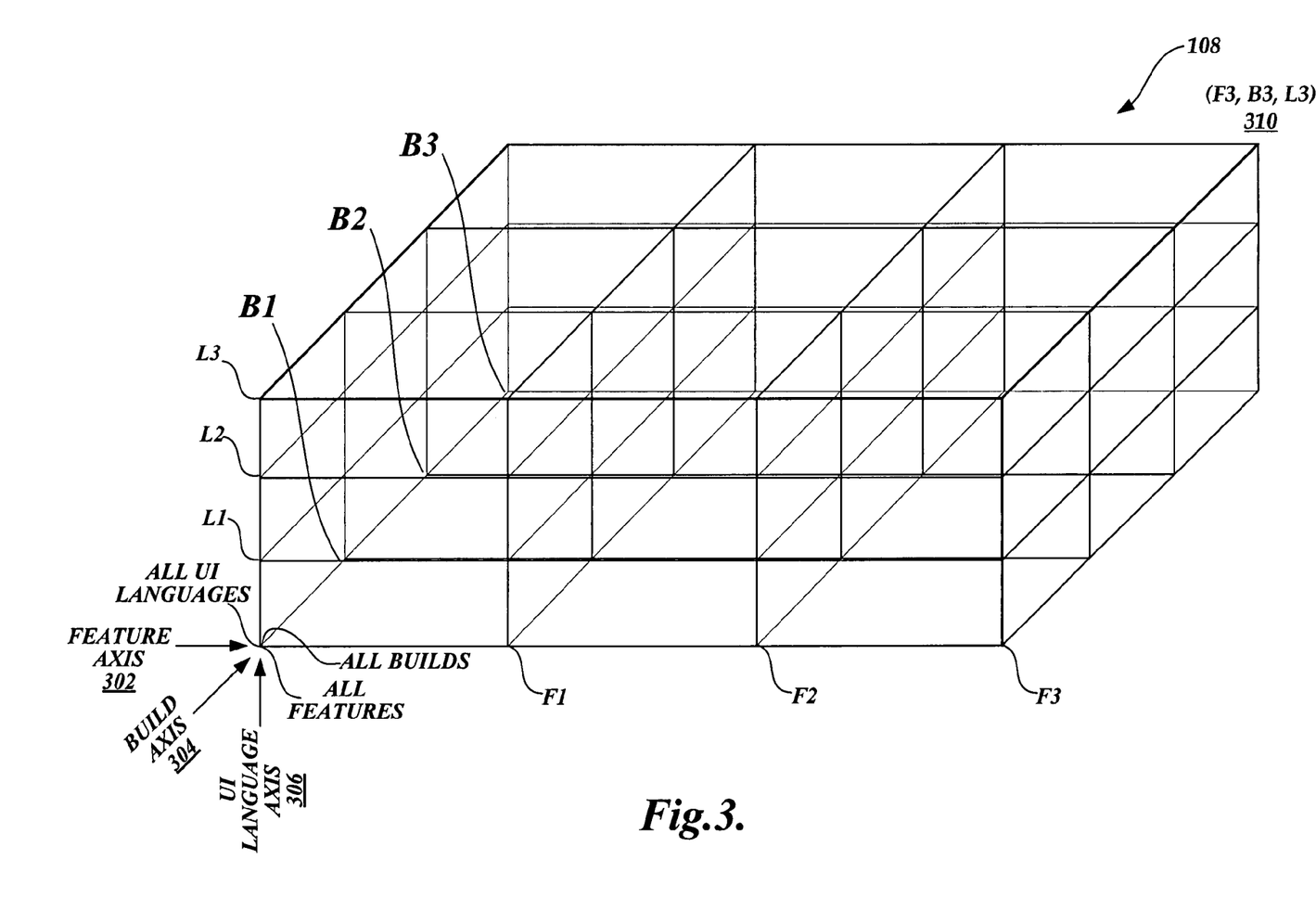
FIG. 3 is a pictorial diagram illustrating an exemplary unified reporting cube that represents the three exemplary data dimensions illustrated in FIG. 2.

FIG. 3 illustrates an exemplary cube 300. The cube 300 represents the three exemplary data dimensions illustrated in FIG. 2. As shown in FIG. 3, each axis of the cube 300 corresponds to an exemplary data dimension in FIG. 2. For example, the Feature axis 302 corresponds to the Feature dimension 202; and the three exemplary values (F1, F2, and F3) in the Feature dimension 202 are marked values on the Feature axis 302. The Build axis 304 corresponds to the Build dimension 204; and the three exemplary values (B1, B2, and B3) in the Build dimension 204 are marked values on the Build axis 304. The UI Language axis 306 corresponds to the UI Language dimension 206; the three exemplary values (L1, L2, and L3) in the UI Language dimension 206 are marked values on the UI Language axis 306.

In an exemplary embodiment of the invention, the origin of each axis represents all values contained in the data dimension represented by the axis. For example, the origin of the Feature axis 302 represents all three exemplary values contained in the Feature dimension 202. The origin of the Build axis 304 represents all three exemplary values contained in the Build dimension 204. The origin of the UI Language axis 306 represents all three exemplary values contained in the UI Language dimension 206.

Each intersection point on the cube 300 represents a triplet that contains a value from each of three exemplary data dimensions. For example, the intersection point 310 contains the triplet (F3, B3, L3). In particular, the values in each of the three coordinates that make up the intersection point at the origins of the three axes are the values contained in each data dimension that the axis represents. That is, the intersection point at the origins of the three axes represents the triplet ((F1, F2, F3), (L1, L2, L3), (B1, B2, B3)). As rows are added or removed from one of the exemplary data dimension tables in the central repository 106, the corresponding dimension in the cube 300 grows or shrinks.

Figure 4:
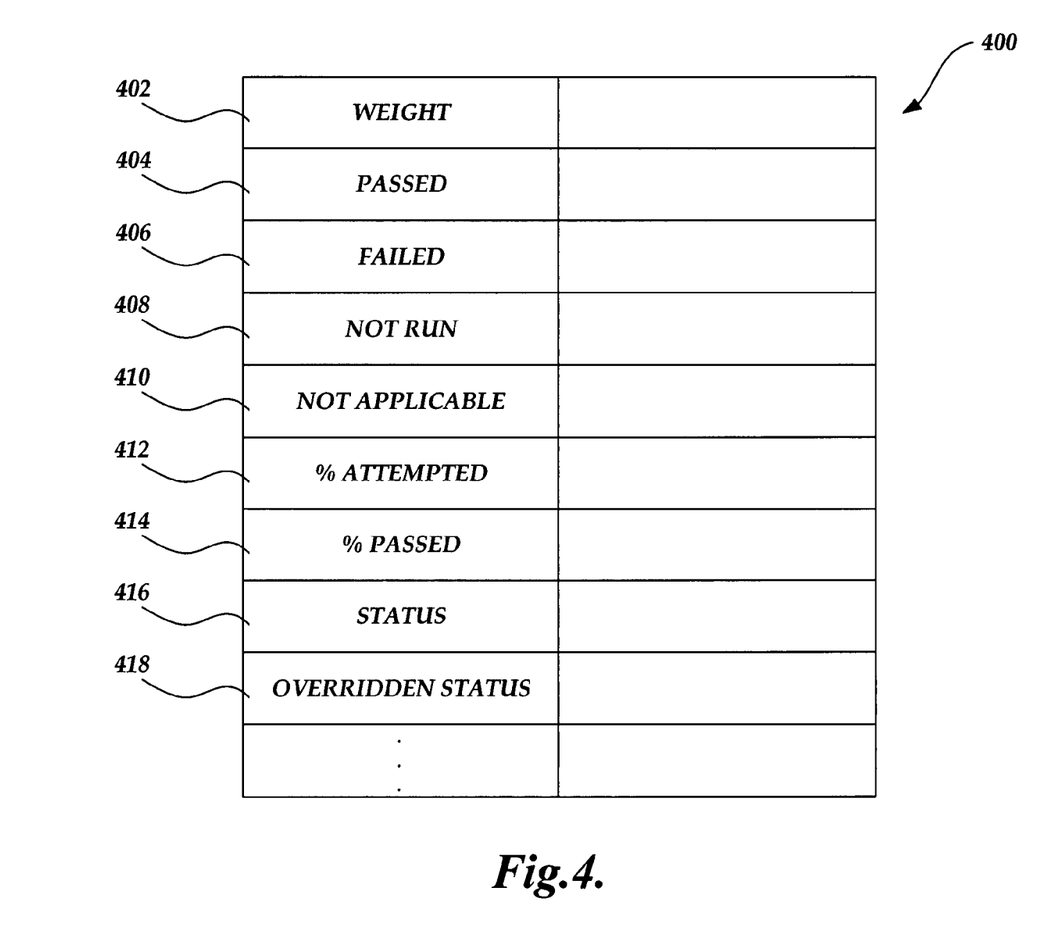
FIG. 4 is a pictorial diagram illustrating a table containing exemplary measurements that a unified reporting cube pre-calculates for the data dimensions that the cube represents.

The invention pre-calculates measurements for each intersection point in the cube 300. FIG. 4 illustrates an exemplary table 400 containing measurements calculated by an exemplary embodiment of the invention for each intersection point in the cube 300. More specifically, each field in the table 400 represents one measurement of how a test case (hereinafter "job") performs with dimension values represented by an intersection point of a cube such as the cube 300.

As shown in FIG. 4, the table 400 includes a measurement named Weight 402. The value of the Weight 402 indicates the relative importance of execution results of a job in comparison to those of other jobs. The table 400 also includes additional measurements such as Passed 404, Failed 406, Not Run 408, and Not Applicable 410. The Passed measurement 404 indicates the number of successful executions of a job. The Failed measurement 406 indicates the number of failed executions of a job. The Not Run measurement 408 identifies the number of jobs that have not been executed. The Not Applicable measurement 410 identifies the number of jobs that are not applicable for a specific machine configuration. In exemplary embodiments of the invention, execution of a job automatically increments one of the Passed 404, Failed 406, Not Run 408, or Not Applicable 410 measurements. The table below illustrates these measurement values for Job A and Job B. As shown, Job B ran only once and failed. Hence, the value of the total "% passed" (1000/1001) should be less than 100% because of the single failure of Job B. However, the computation result of each % value is normally rounded off to show an integer value. Because of the round-off, the value of the total "% passed" becomes 100%. This value does not correctly reflect Job B's single failure, which can be vital data if Job B is an important job.

TOTAL % PASSED WITH ROUND-OFF

|  | Pass | Fail | Not Run | Not Applicable | % Pass |
|---|---|---|---|---|---|
| Job A | 1000 | 0 | 0 | 0 | 100% |
| Job B | 0 | 1 | 0 | 0 | 0% |
| Total | 1000 | 1 | 0 | 0 | 100% |

To cure this deficiency, embodiments of the invention associate a job with a Weight property (Job.Weight) to indicate the relative importance of the job when compared with other jobs. For example, if Job B is more important than Job A, the Weight property of Job B is assigned a higher value to reflect this importance. The Weight property thus keeps track of the importance of a job, which can otherwise be lost during round-off.

Returning to FIG. 4, the value of the Weight 402 measurement is the computed weight of a job executed in the dimension values represented by a particular intersection point in a cube. In exemplary embodiments of the invention, the value of the Weight measurement 402 is calculated using the following formula: Job.Weight*(Job.Results.Count>0? Job.Results.Count:1). The formula indicates that the value of the Weight measurement 402 is the product of the job's assigned weight (Job.Weight) times the number of executions of the job (Job.Results.Count). In the case that Job.Results.Count is zero, the value of the Weight measurement 402 equals the job's assigned weight.

Because the value of the Weight 402 measurement is a relative weighting, values of the Passed measurement 404, the Failed measurement 406, and the "Not Run" 408 measurement are normalized. A normalization process adjusts the values of these three measurements so they reflect the job's importance. If a job has never been executed, i.e., the Job.Results.Count is zero, the values of these three measurements are set to be zero.

Exemplary embodiments of the invention use the following formulas to calculate normalized values for the Passed 404, Failed 406, and Not Run 408 measurements.

Normalized Failed=Roundup(Failed*Weight/ (Passed+Failed+Not Run))

Normalized Not Run=Min((Weight−Normalized Failed), Roundup (Not Run* Weight/(Passed+ Failed+Not Run)))

Normalized Passed=Weight−(Normalized Not Run+ Normalized Failed)

Consequently, the normalization process adjusts the values of the Passed measurement 404, the Failed measurement 406, and the "Not Run" measurement 408 so the values reflect a job's importance. As a result, in the table 400, the value of a Passed measurement 404 indicates the normalized sum of all passes in the execution results of a job. The value of a Failed measurement 406 indicates the normalized sum of all failures in the execution results of a job. The value of a "Not Run" measurement 408 indicates the normalized sum of all "Not Run" counts in the execution results of a job.

The table 400 may include other measurements. For example, the value of a "% Attempted" measurement 412 indicates percentages of jobs that have been attempted for execution. The value is the result of dividing the sum of the value of the Passed measurement 404 and the value of the Failed measurement 406 with the value of the Weight measurement 402. The value of a "% Passed" measurement 414 indicates the pass rate of a job. The value is the ratio of the value of the Passed measurement 404 and the sum of the value of the Passed measurement 404 and the value of the Failed measurement 406.

The exemplary table 400 may also include a Status measurement 416, which may contain a green, yellow, or red color code that indicates the overall performance of a job. In an exemplary embodiment of the invention, by default, the formula for calculating the value for the Status measurement 416 is "If (% Passed<=75%) Status=Red; else if ((% Attempted>95%) && (% Passed>95%)) Status=Green; else Status=Yellow;". A user may customize the default formula, for example, by changing the threshold values of the "% Passed" and/or the "% Attempted" measurements. Consequently, the exemplary table 400 may further include an "Overridden Status" measurement 418 that includes a user-modified version of the Status measurement 416.

In an exemplary embodiment of the invention, a cube is implemented as a database. The database includes the data of interest, i.e., one or more selected data dimensions from the central repository 106. The database pre-calculates measurements for each intersection point of the selected data dimensions. The database stores the pre-calculated measurements. The database may be periodically updated to reflect changes in the central repository 106, for example, based on a time interval specified by a user.

The cubes 108 thus enhance performance of queries that seek to summarize data of interest in a central repository 106 in various ways. For example, a query can be a request for the pass rate and attempt rate for a range of test cases with specific constraints for specific processors and UI languages. By pre-calculating measurements on the test cases with the specific constraints, a cube 108 enables such a query to be answered in a few seconds or less, regardless of how many hundreds of millions of rows of relevant data are stored in the central repository 106.

Referring back to FIG. 1, embodiments of the invention also provide a unified reporting cube administration (hereinafter "administration UI") UI 110, through which a user may manage the central repository 106 and the plurality of cubes 108. The administration UI 110 enables a user to create a cube 108 for the central repository 106, to add or remove one or more data stores that provide data for the central repository 106, and to select or deselect data dimensions for a cube. The administration UI 110 thus allows a user to specify a cube according to the user's specific reporting needs. For example, the administration UI 110 presents common data dimensions among available data stores and allows a user to choose specific data dimensions for a cube. In some embodiments of the invention, the administration UI 110 also allows a user to configure the crawler service 104 for collecting data from the plurality of data stores A-Z (102A-102Z).

Referring to FIG. 1, the computing architecture 100 further includes a unified reporting UI 112, where all reports against data in a central repository 106 can be produced. The unified reporting UI 112 is a presentation layer on top of the cubes 108 and any central repository 106. The unified reporting UI 112 is connected with an entire enterprise computing network and, hence, is able to list all available cubes 108 in the enterprise computing network. The unified reporting UI 112 enables a user to connect to any cube 108 presented in the enterprise computing network and create one or more reports based on the cube 108. A user, such as a software engineer or a corporate executive, can create different reports by using different cubes 108.

In embodiments of the invention, the unified reporting UI 112 may include a selection of default reports. A user can create or customize one or more reports to fit the user's specific needs. One exemplary embodiment of the invention allows a user to customize an existing report by providing a report designer in the unified reporting UI 112. The report designer enables a user to modify an existing report. In one exemplary embodiment of the invention, the unified reporting UI 112 is a Web site, which a user can access by typing in the URL address for the Web site in any available Web browser.

Figure 5:
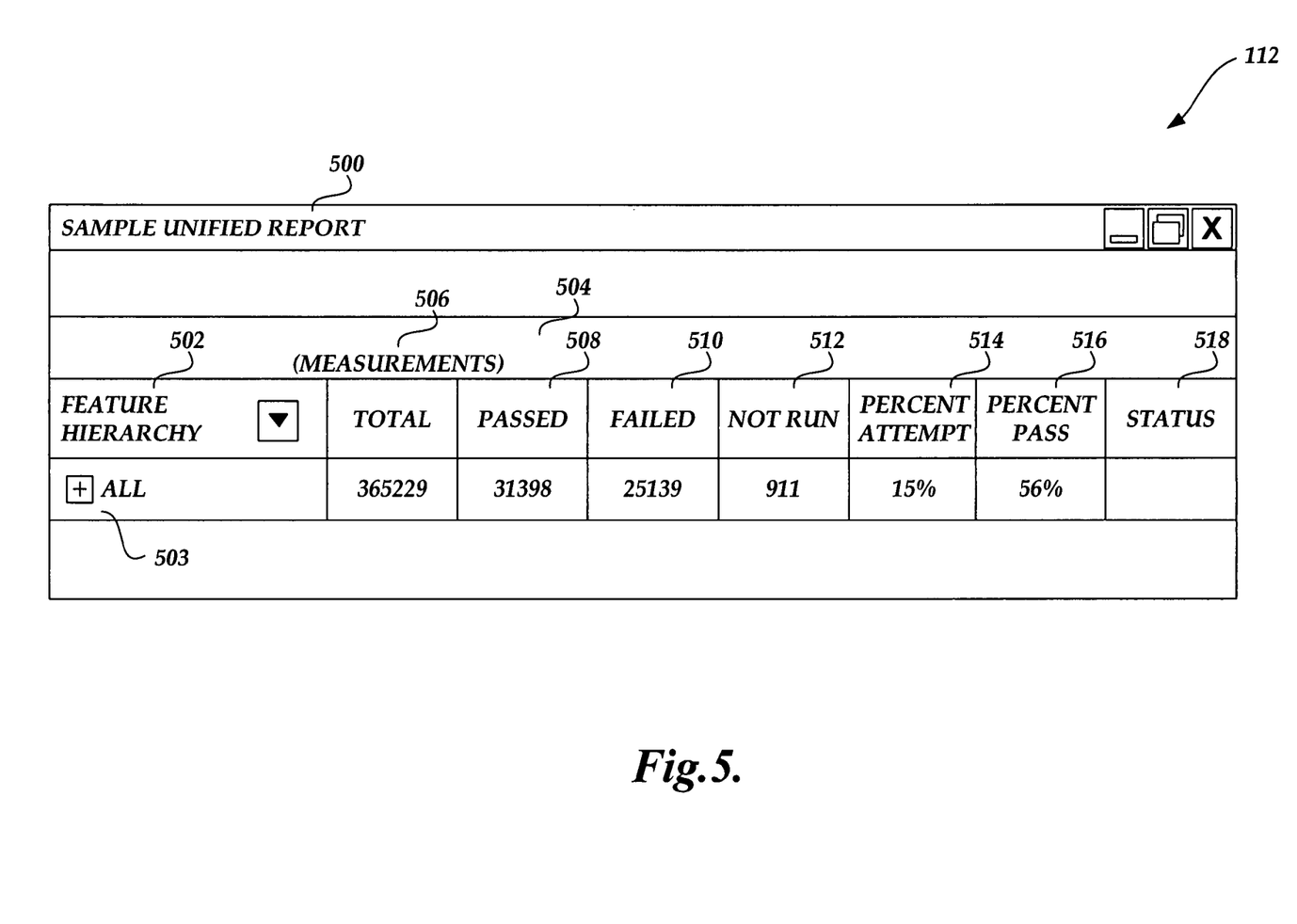
FIG. 5 is a pictorial diagram illustrating an exemplary report based on measurements pre-calculated by a unified reporting cube.

FIG. 5 is an exemplary unified reporting UI 112 that presents a sample unified report 500. To generate the sample unified report 500, a user selects a feature hierarchy from a feature drop-down list 502. The feature hierarchy, as the previous table 202 (FIG. 2) shows, may include exemplary values such as F1, F2, and F3. The feature hierarchy is used as the row axis of the sample unified report 500. A user may also select a particular feature in the feature hierarchy as the row axis of the sample unified report 500 by selecting the icon 503 and picking the feature of interest from the expanded display of the icon 503. The unified reporting UI 112 also allows a user to select from a measurement drop-down list 504 one or more measurements that form the column axis of the sample unified report 500. As shown in FIG. 5, for the illustrated sample unified report 500, the selected measurements are Total 506, Passed 508, Failed 510, Not Run 512, % Attempted 514, % Passed 516, and Status 518.

The invention thus allows a user to quickly create multi-dimensional reports based on pre-calculated measurements of data of interest in a central repository, which aggregates data from different data stores in an enterprise computing network.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for generating reports based on data existing in an enterprise computing network, comprising:
   a plurality of data stores, each of data stores supplying a data for a central repository;
   a central repository for storing the data collected from the plurality of data stores;
   a crawler service for continuously and repeatedly collecting data from the plurality of data stores and storing the data in the central repository, the crawler service only querying the data in the data stores that has been changed since a previous crawl;
   a unified reporting cube for pre-calculating measurements for data of interest in the central repository;
   a unified reporting cube administration user interface for defining said unified reporting cube, the unified reporting cube administration user interface enabling a user to: (i) create the unified reporting cube for the central repository; (ii) add one or more data stores that provide data for the central resspository; (iii) remove one or more data stores that provide data for the central repository; (iv) select data dimensions for the unified reporting cube; and (v) deselect data dimensions for the unified reporting cube; and
   a unified reporting user interface for generating a report based on measurements pre-calculated by the unified reporting cube, the unified reporting user interface comprising a Web site accessible by the user, the unified reporting user interface providing access to the unified reporting cube, the unified reporting user interface including a selection of default reports customizable by the user.

2. The system of claim 1, wherein the central repository specifies one or more data stores that supply data to the central repository.

3. The system of claim 1, wherein a unified reporting cube normalizes a pre-calculated measurement for the data of interest to reflect the importance of the data of interest relative to other data in the central repository.

4. A computer-implemented method for generating reports based on data existing in an enterprise computing network, comprising:
   gathering data existing in the enterprise computing network to a central repository with a single database schema, wherein gathering data existing in the enterprise computing network to a central repository with a single database schema includes:
   (i) identifying a plurality of data stores in the enterprise computing network that supply data to the central repository;
   (ii) collecting data from the plurality of data stores and storing them in the central repository according to the single database schema by using a crawler service for continuously and repeatedly collecting data from the plurality of data stores and storing the data in the central repository, the crawler service only querying the data in the data store that has been changed since a previous crawl; and
   (iii) updating the central repository according to data changes in the plurality of data stores;
   creating a unified reporting cube for pre-calculating measurements for data of interest in the central repository by using a unified reporting cube administration user interface, the unified reporting cube administration user interface enabling a user to: (i) create the unified reporting cube for the central repository; (ii) add one or more data stores that provide data for the central repository; (iii) remove one or more data stores that provide data for the central repository; (iv) select data dimensions for the unified reporting cube; and (v) deselect data dimensions for the unified reporting cube; and using a unified reporting user interface to generate a report based on measurements pre-calculated by the unified reporting cube, the unified reporting user interface comprising a Web site accessible by the user, the unified reporting user interface providing access to the unified reporting cube, the unified reporting user interface including a selection of default reports customizable by the user.

5. The computer-implemented method of claim 4, wherein a pre-calculated measurement for the data of interest is normalized to reflect the importance of the data of interest relative to other data in the central repository.

6. The computer-implemented method of claim 4, wherein creating one or more unified reporting cubes includes:
   identifying data of interest in the central repository;
   calculating one or more measurements for the data of interest; and
   storing the calculated measurements.

7. A computer-readable medium containing computer-executable instructions for generating reports based on data existing in an enterprise computing network, comprising:
   gathering data existing in the enterprise computing network to a central repository with a single database schema, wherein gathering data existing in the enterprise computing network to a central repository with a single database schema includes:
      (i) identifying a plurality of data stores in the enterprise computing network that supply data to the central repository;
      (ii) collecting data from the plurality of data stores and storing them in the central repository according to the single database schema by using a crawler service for continuously and repeatedly collecting data from the plurality of data stores and storing the data in the central repository, the crawler service only querying the data in the data store that has been changed since a previous crawl; and
      (iii) updating the central repository according to data changes in the plurality of data stores;
   creating a unified reporting cube for pre-calculating measurements for data of interest in the central repository by using a unified reporting cube administration user interface, the unified reporting cube administration user interface enabling a user to: (i) create the unified reporting cube for the central repository; (ii) add one or more data stores that provide data for the central repository; (iii) remove one or more data stores that provide data for the central repository; (iv) select data dimensions for the unified reporting cube, and (v) deselect data dimensions for the unified reporting cube; and using a unified reporting user interface to generate a report based on measurements pre-calculated by the unified reporting cube, the unified reporting user interface comprising a Web site accessible by the user, the unified reporting user interface providing access to the unified reporting cube, the unified reporting user interface including a selection of default reports customizable by the user.

8. The computer-readable medium of claim 7, wherein a pre-calculated measurement for the data of interest is normalized to reflect the importance of the data of interest relative to other data in the central repository.

9. The computer-readable medium of claim 7, wherein creating one or more unified reporting cubes includes:
   identifying data of interest in the central repository;
   calculating one or more measurements for the data of interest; and
   storing the calculated measurements.

10. The computer-readable medium of claim 7, wherein the data gathered to the central repository include one or more computing jobs ("job") and one or more results of executing a job.

11. The computer-readable medium of claim 10, wherein the pre-calculated measurements include:
   normalized number of attempted executions of a job ("Weight");
   normalized number of successful executions of the job ("Passed"); and
   normalized number of failed executions of the job ("Failed").

12. The computer-readable medium of claim 11, wherein the pre-calculated measurements further include any item selected from a group consisting of:
   an attempt rate that is the result of ((Passed+Failed)/ Weight);
   a pass rate that is result of (Passed/(Passed+Failed)); and
   a status code that indicates the overall performance of a job.

* * * * *

UNITED STATES PATENT AND TRADEMARK OFFICE
CERTIFICATE OF CORRECTION

| | | |
|---|---|---|
| PATENT NO. | : 7,383,279 B2 | |
| APPLICATION NO. | : 11/074463 | |
| DATED | : June 3, 2008 | |
| INVENTOR(S) | : Kailas Gangadhar Tare et al. | |

It is certified that error appears in the above-identified patent and that said Letters Patent is hereby corrected as shown below:

In column 10, line 17, in Claim 1, delete "respository;" and insert -- repository; --, therefor.

Signed and Sealed this
Nineteenth Day of April, 2011

David J. Kappos
*Director of the United States Patent and Trademark Office*